US012747626B2

(12) United States Patent
Maughan

(10) Patent No.: US 12,747,626 B2
(45) Date of Patent: Sep. 29, 2026

(54) DOOR WITH REPLACEABLE PANEL

(71) Applicant: Jared Maughan, Nibley, UT (US)

(72) Inventor: Jared Maughan, Nibley, UT (US)

( * ) Notice: Subject to any disclaimer, the term of this patent is extended or adjusted under 35 U.S.C. 154(b) by 0 days.

(21) Appl. No.: 18/813,290

(22) Filed: Aug. 23, 2024

(65) Prior Publication Data

US 2025/0067117 A1 Feb. 27, 2025

Related U.S. Application Data

(60) Provisional application No. 63/534,514, filed on Aug. 24, 2023.

(51) Int. Cl.
*E06B 3/72* (2006.01)
*E06B 3/70* (2006.01)
*E06B 7/28* (2006.01)

(52) U.S. Cl.
CPC .................. *E06B 3/72* (2013.01); *E06B 3/70* (2013.01); *E06B 7/28* (2013.01); *E06B 2003/7013* (2013.01)

(58) Field of Classification Search
CPC ...... E06B 3/78; E06B 3/72; E06B 2003/7013; E06B 2003/7011
USPC ........................................... 49/463, 465, 466
See application file for complete search history.

(56) References Cited

U.S. PATENT DOCUMENTS

| | | | | |
|---|---|---|---|---|
| 679,855 A * | 8/1901 | Mockridge | E06B 3/28 | 49/465 |
| 5,083,398 A * | 1/1992 | Kolbeck | E05B 63/248 | 292/37 |
| 9,631,419 B1 * | 4/2017 | Hartley | E06B 5/11 | |
| 9,963,929 B2 * | 5/2018 | Glass | E06B 1/52 | |
| 12,044,064 B2 * | 7/2024 | Hutton | G02B 6/001 | |
| 2002/0089271 A1 * | 7/2002 | Turner | E06B 5/006 | 312/321.5 |
| 2004/0055221 A1 * | 3/2004 | Hoffman | E05F 1/105 | 49/386 |
| 2010/0300003 A1 * | 12/2010 | Goode | E06B 3/72 | 49/504 |
| 2019/0257142 A1 * | 8/2019 | Koehl | E06B 3/72 | |
| 2023/0332446 A1 * | 10/2023 | Isler | E05D 11/1007 | |
| 2024/0247538 A1 * | 7/2024 | Miller | E06B 5/11 | |

* cited by examiner

*Primary Examiner* — Marcus Menezes
(74) *Attorney, Agent, or Firm* — Workman Nydegger

(57) ABSTRACT

A door system includes a door having a pocket in a face thereof, a panel sized and configured to be positioned within the pocket, and one or more connection features configured to selectively hold the panel in the pocket and allow for ready removal of the panel from the pocket.

17 Claims, 5 Drawing Sheets

DOOR WITH REPLACEABLE PANEL

CROSS-REFERENCE TO RELATED APPLICATIONS

This application claims priority to and the benefit of U.S. Patent Application No. 63/534,514, filed Aug. 24, 2023, and entitled Door with Replaceable Panel, the entire content of which is incorporated herein by reference.

BACKGROUND

1. Technical Field

The present disclosure relates generally to doors. More particularly, the present disclosure relates to door with selectively replaceable panels.

2. The Relevant Technology

One of the most common features of modern buildings is the use of doors. Doors are commonly used to selectively close external entry/exit points in the building. Such external doors can help protect the interior of the building from the exterior environment, including inclement weather and animals, and provide safety and privacy to the building's occupants. Doors are also used to enable individual spaces within the building to be selectively closed off from other spaces within the building.

While doors provide numerous benefits, they are semi-permanent aspects of a building. While doors can be changed or replaced, there is significant effort and expense associated with such an endeavor. Short of replacing a door, there are relatively limited ways to readily change the aesthetic of a door.

One way to change the aesthetic of a door is to paint the door. While this may be a good option in certain situations, it becomes a less feasible option if the aesthetic of the door is to be changes with any regularity or frequency. Options for changing the aesthetic of a door regularly or frequently include hanging decorations (e.g., wreaths or signs) on the door. This can be done by inserting a fastener (e.g., nail or screw) into the door and hanging the decorations therefrom. In other cases, an adhesive-backed hook can be attached to the door or a hanger can be suspended from the top of the door and the decorations can be hung therefrom.

Using fasteners may be undesirable because they will remain in the door even when decorations are not hung therefrom, which can be undesirable from an aesthetics perspective. If the fasteners are removed from the door, they will undesirably leave a hole in the door. Adhesive-backed hooks may also be undesirable because they may: have less weight capacity, become undesirably detached from the door, and leave a residue on the door after removal. Hangers that are suspended from the top of the door may also be undesirable because they may scratch the finish on the door. In all of these cases, the decorations hung on the door are subject to easy theft or being blown off of the door by wind.

As such, there are a number of problems in the art that can be addressed relating to changing the aesthetics of doors.

BRIEF SUMMARY

The present disclosure addresses the foregoing shortcomings by providing a door with selectively replaceable panels.

The panels may have different aesthetics. The panels can be easily replaced or changed to modify the aesthetic of the door.

For example, in one embodiment of the present disclosure, a door system may include: a door having a pocket in a face thereof, a panel sized and configured to be positioned within the pocket, and one or more connection features configured to selectively hold the panel in the pocket and allow for ready removal of the panel from the pocket.

In another embodiment, a door system includes a door having a pocket in a face thereof, a panel sized and configured to be positioned within the pocket, one or more connection features associated with the door and the panel, the one or more connection features being configured to selectively secure the panel within the pocket and allow for selective removal of the panel for replacement with a different panel.

In yet another embodiment, a door system includes a door having a pocket in a face thereof, a panel sized and configured to be positioned within the pocket, a retaining frame configured to be positioned within the pocket and over a portion of the panel to selectively retain the panel within the pocket, and one or more connection features associated with the door and the retaining frame, the one or more connection features being configured to selectively secure the retaining frame within the pocket and allow for selective removal of the retaining frame enable the panel to be replaced with a different panel.

Additional features and advantages of the disclosed embodiments will be set forth in the description which follows, and in part will be obvious from the description, or may be learned by the practice of the disclosure. These and other features will become more fully apparent from the following description and appended claims or may be learned by the practice of the present disclosure.

BRIEF DESCRIPTION OF THE DRAWINGS

To further clarify the above and other advantages and features of the present disclosure, a more particular description will be rendered by reference to specific embodiments thereof which are illustrated in the appended drawings. It is appreciated that these drawings depict only illustrated embodiments of the disclosure and are therefore not to be considered limiting of its scope. The disclosure will be described and explained with additional specificity and detail through the use of the accompanying drawings in which.

DETAILED DESCRIPTION

The present disclosure relates to doors with replaceable or interchangeable panels. The door may have one or more pockets in a face thereof (e.g., exterior or interior face). A pocket may take the form of a recess in the face of the door or an opening that extends through the door (e.g., between opposing faces thereof). A panel may be selectively positioned within the pocket and held in place by a retaining frame. The retaining frame may be selectively secured to the door to hold the panel in place within the pocket. In some cases, the retaining frame is positioned at least partially within the pocket. The retaining frame may be selectively removed from the door/pocket to allow for the panel to be removed. Once the panel is removed, a different panel may be inserted into the pocket and the retaining frame may be reinstalled to hold the new panel in place. The panels may be changed to provide the door with a different aesthetic, such as for holidays, parties, seasons, or any other desired aesthetic change.

Attention is now directed to the drawings, which illustrate example embodiments of doors with pockets, interchangeable panels, and retaining frames. Additionally, the drawings illustrate different examples of locking or securing mechanisms that may be used to selectively secure the retaining frame to the door. As discussed below, the example locking or securing mechanisms may include male/female connections, apertures and insertable rods, buttons, magnets, camp levers, and the like.

Figure 1:
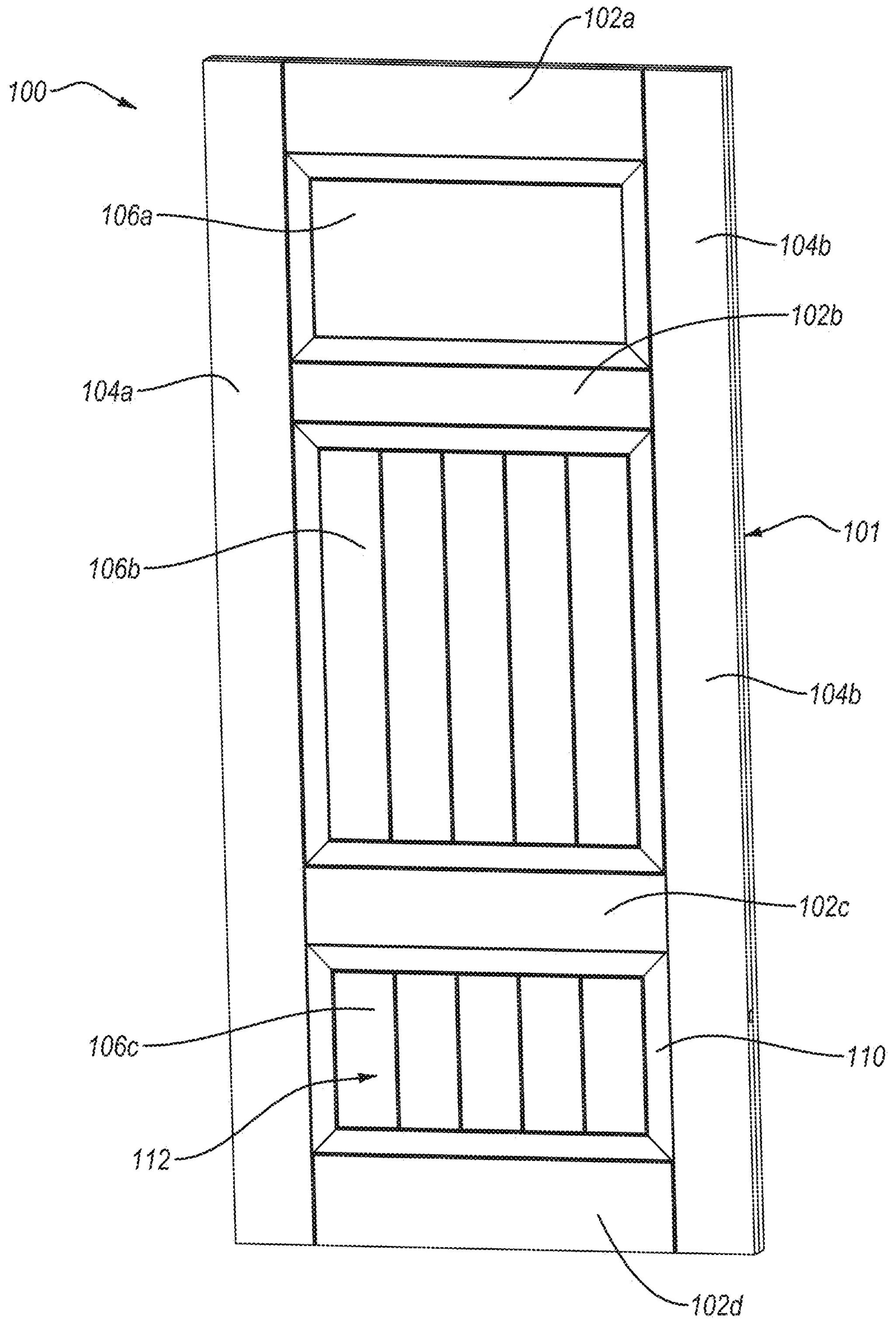
FIG. 1 illustrates a door system according to an embodiment of the present disclosure.

FIG. 1 illustrates a door system 100 according to one example embodiment. The door system 100 includes a door 101 that is illustrated as being constructed from rails 102 (rails 102*a*, 102*b*, 102*c*, 102*d*), stiles 104 (stiles 104*a*, 104*b*), and panels 106 (panels 106*a*, 106*b*, 106*c*, 106*d*) mounted between the rails 102 and stiles 104. In other embodiments, however, the door 101 may be formed with other constructions. For instance, the door 101 may be formed from a solid panel. In still other embodiments, the door 101 may be formed from a frame with panels (e.g., fiberglass, wood, metal, etc.) applied to opposing sides thereof.

Figure 2:
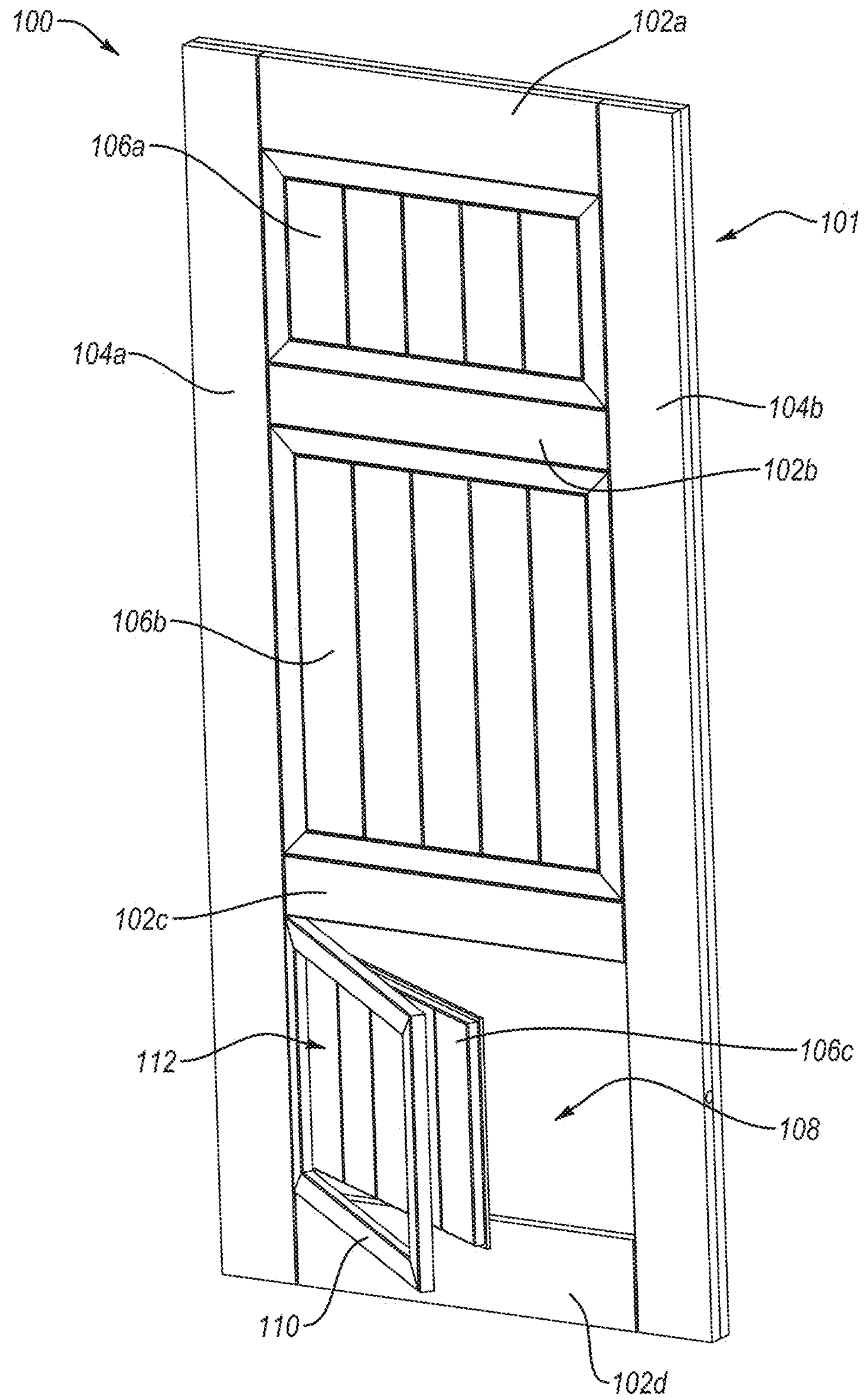
FIG. 2 illustrates the door system of FIG. 1 with a panel being removed according to one example embodiment.
Figure 3:
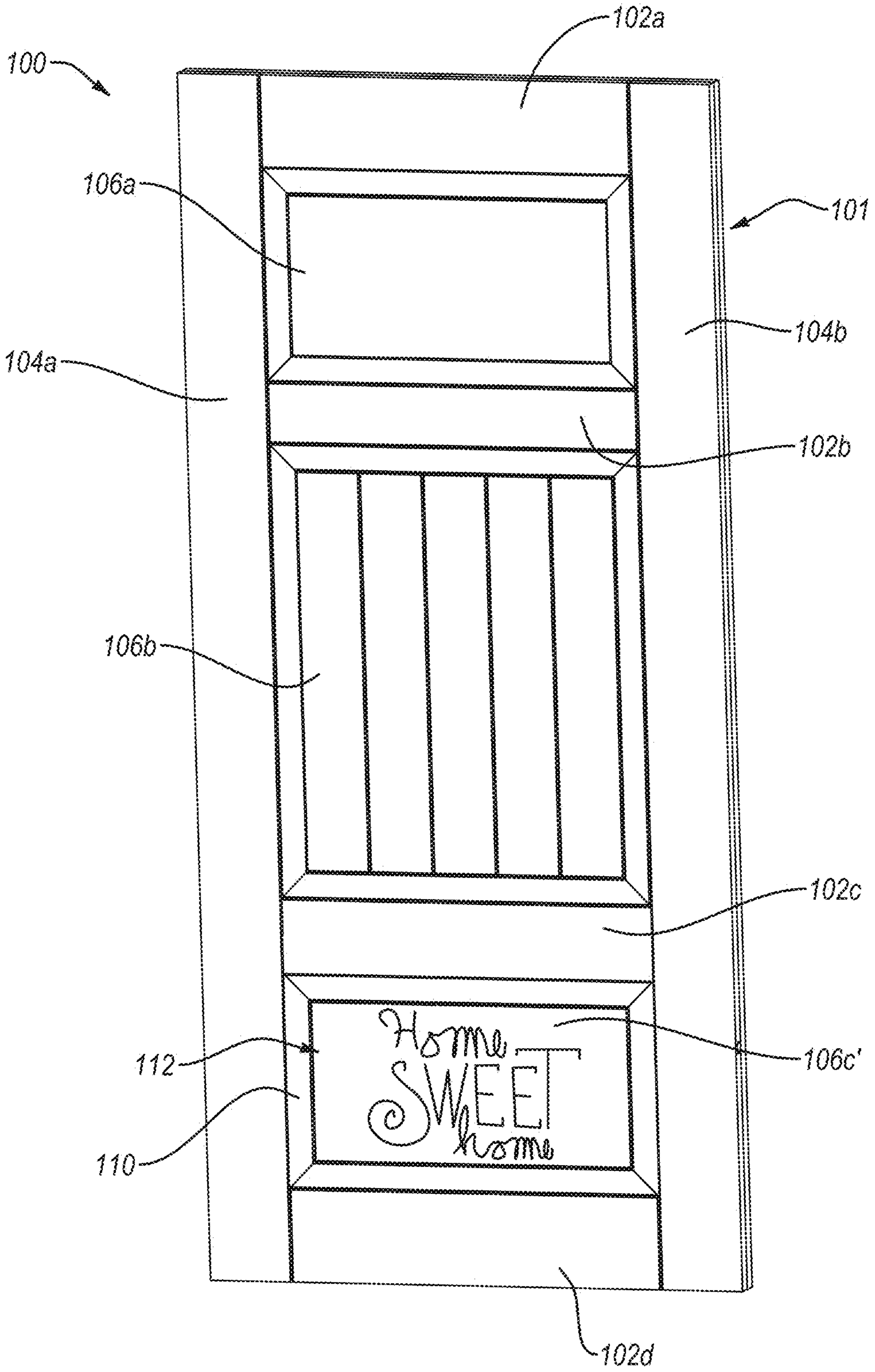
FIG. 3 illustrates the door system of FIG. 1 with a replacement panel installed therein.

Regardless of the specific type of construction or style of the door 101, the door 101 may include at least pocket 108 that is configured to receive at least one of the panels 106 therein. As shown in FIG. 2, the pocket 108 extends between and is partially formed by the rails 102*c*, 102*d* and the stiles 104*a*, 104*b*. The pocket 108 also extends inward from the faces of the rails 102 and stiles 104. In the illustrated embodiment, the pocket 108 extends inward to the panel 106*d*. The illustrated face of the panel 106*d* may partially form the pocket 108. In other embodiments, the door 101 may not include the panel 106*d* and the pocket 108 may extend entirely through the door 101. In such embodiments, the pocket 108 may include one or more shoulders against which the panel 106*c* may be registered and which partially form the pocket 108.

In embodiments with the panel 106*d*, the panel 106*d* may be permanently mounted between the rails 102*c*, 102*d* and the stiles 104*a*, 104*b*. In other embodiments, the panel 106*d* may be selectively removable from the door 101. In either case, a face of the panel 106*d* may be visible on one side of the door 101 and a face of the panel 106*c* may be visible on the opposite side of the door 101. The panels 106*c*, 106*d* may also include faces that face (and optionally abut) one another within the pocket 108.

The panel 106*c* may be configured (e.g., sized, shaped, etc.) to be selectively received and secured within the pocket 108. For instance, as shown in FIG. 1, the door 101 may include a retaining frame 110 that is configured to be connected to the stile 104 (or rails 102) and retain the panel 106*c* within the pocket 108. The retaining frame 110 may hold the panel 106*c* in place between the retaining frame 110 and the panel 106*d* or a shoulder within the pocket 108. As shown, the retaining frame 110 may include an opening 112 therethrough. As can be seen, the opening 112 allows for the panel 106*c* to be seen therethrough. In addition to holding the panel 106*c* within the pocket 108, the retaining frame 110 may also provide the door 101 with a particular appearance. For instance, the retaining frame 110 may act or appear as a finish molding around the panel 106*c*.

As shown in FIG. 2, the retaining frame 110 may be selectively removable from the pocket 108 to allow for the panel 106*c* to be removed. For instance, the retaining frame 110 may be disconnected from the door 101 and removed from over the panel 106*c*. Thereafter, the panel 106*c* may be removed from the pocket 108. With the panel 106*c* removed from the pocket 108, a different panel 106*c*' may be inserted into the pocket 108. The retaining frame 110 may then be reinstalled to hold the panel 106*c*' in place within the pocket. The panel 106*c* may be stored for later use.

Any number of panels may be installed within the pocket 108 to vary the aesthetic of the door 101. For instance, the panel 106*c* may have an aesthetic that matches one or more of the other panels 106*a*, 106*b*, such as a wood panel. The panels 106*c*' may have aesthetics that are different from the panel 106*c*. For instance, the panels 106*c*' may include different designs (e.g., checkerboard, herringbone, etc.), materials (e.g., wood, metal, glass, etc.), holiday or seasonal images, greetings (e.g., "Happy Holidays," "Merry Christmas,"), phrases (e.g., "Home Sweet Home"), and the like. Thus, the overall aesthetic of the door 101 may be quickly and easily changed depending on the desires at any given time.

Figure 4A:
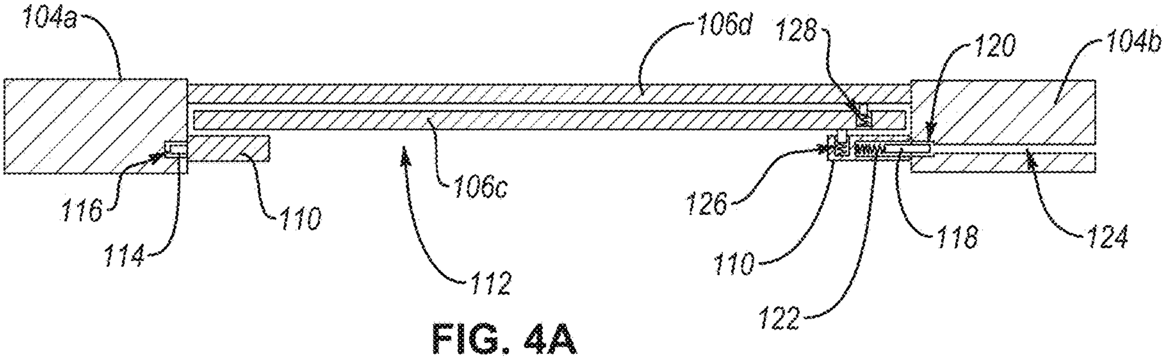
FIGS. 4A-4C illustrate cross-sectional view of the door system of FIG. 1 to illustrate connection features according to one embodiment of the present disclosure.
Figure 4B:
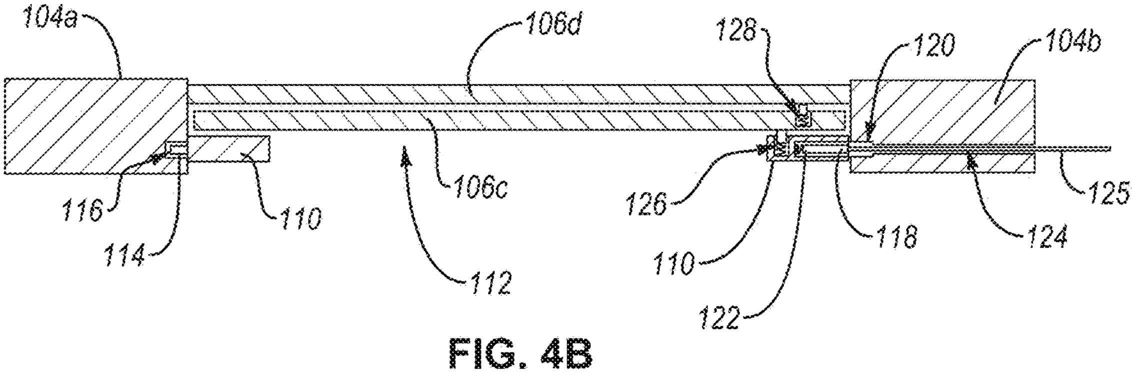
Figure 4C:
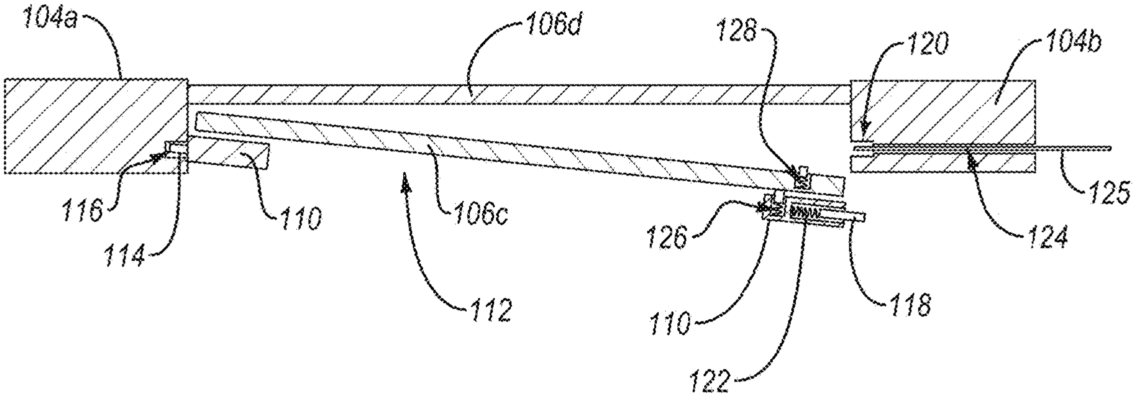

The specific manner in which the retaining frame 110 is secured to the door 101 may vary from one embodiment to another. FIGS. 4A-4C illustrates one example embodiment. Specifically, FIGS. 4A-C illustrate cross-sectional views of the door 101 to illustrate the connection features associated with the retaining frame 110 and the stiles 104*a*, 104*b*.

As illustrated, one side of the retaining frame 110 includes a latch 114 that extends therefrom. The latch 114 may extend a fixed distance from the side of the retaining frame 110. The stile 104*a* includes a receptacle 116 that is configured to receive the latch therein. The opposite side of the retaining frame 110 includes a latch 118. The latch 118 is selectively movable relative to the retaining frame 110 between extended and retracted positions. In the retracted position, the latch 118 may be positioned entirely within the retaining frame 110 or only extend out of the retaining frame 110 a short distance (e.g., 1/16 inches, 1/8 inches, 1/4 inches, 1/5 inches). In the extended position, the latch 118 extends out of the side of the retaining frame 110 a distance that is longer than in the retracted position. In the extended position, the latch 118 may extend out of the retaining frame 110 far enough to extend into a receptacle 120 in the stile 104*b*, as shown in FIG. 4A.

The latch 118 may be biased towards the extended position. A biasing member 122 may be at least partially disposed between the retaining frame 110 and the latch 118. The biasing member 122 may exert a biasing force on the latch 118 that urges the latch 118 to the extended position. However, the biasing force of the biasing member 122 may be selectively overcome to allow for the latch 118 to move to the retracted position. For instance, the stile 104*b* may include a channel 124 that extends from an outer edge of the stile 104*b* and into the receptacle 120. A rod or key 125 may be inserted through the channel 124 to engage the latch 118. The rod or key may be used to push the latch 118 from the extended position to the retracted position, thereby disengaging the latch 118 from the receptacle 120, as shown in FIG. 4B.

While a rod or key 125 may be used to disengage the latch 118, this is merely exemplary. In other embodiments, the stile 104*b* may have a button or lever incorporated therein, pressing or moving the button or lever may engage the latch 118 and move it to the retracted position.

In any event, with the latch 118 disengaged from the receptacle 120, the retaining frame 110 may be removed from the pocket 108. For instance, as shown in FIG. 4C, the retaining frame 110 may be pivoted out of the pocket 108 such that the side with the latch 118 is removed from the pocket 108. Thereafter, the rest of the retaining frame 110 may be removed from the pocket 108, including moving the retaining frame 110 laterally to withdraw the latch 114 from the receptacle 116.

In some embodiments, an ejection feature 126 may be included to facilitate removal of the retaining frame 110 from the pocket 108. In the illustrated embodiment, the ejection feature 126 includes a spring-loaded button in the back side of the retaining frame 110. When the retaining frame 110 is installed in the pocket 108, the button is configured to engage the panel 106*d* and move to a retracted position as shown in FIG. 4C. When the latch 118 is disengaged from the receptacle 120, the spring associated with the button urges the button to an extended position. The engagement of the button with the panel 106*d* and the force of the spring causes the retaining frame 110 to move at least partially out of the pocket 108 (similar to FIG. 4C).

While the ejection feature 126 is illustrated as being part of the retaining frame 110, this is merely an example. In other embodiments, the ejection feature 126 may be incorporated into the panel 106*c*. The ejection feature may also be incorporated into the pocket 108.

Similar to the ejection feature 126, another ejection feature 128 may be included to facilitate removal of the panel 106*c* from the pocket 108. In the illustrated embodiment, the ejection feature 128 includes a spring-loaded button in the back of the panel 106*c*. When the retaining frame 110 is removed from the pocket 108, the spring-loaded button may push the panel 106*c* at least partially out of the pocket 108, as shown in FIG. 4C. While the ejection feature 128 is illustrated as being part of the panel 106*c*, the ejection feature 128 may alternative be incorporated into the panel 106*d*.

As noted above, once the panel 106*c* has been removed from the pocket 108, a different panel 106*c*' may be inserted into the pocket 108. With the panel 106*c*' in the pocket 108, the retaining frame 110 may be reinstalled. This may include inserting the latch 114 into the receptacle 116 and pivoting the retaining frame into the pocket 108. The latch 118 may be moved to the retracted position while the retaining frame 110 is pivoted into the pocket 108. This may be done manually (e.g., the user presses the latch 118 to the retracted position) or as part of the pivoting motion. For instance, the extended latch 118 may engage the stile 104*b*, which may cause the latch 118 to move to the retracted position. Once the retaining frame 110 is fully positioned within the pocket 108, the latch 118 may extend into the receptacle 120, thereby securing the retaining frame 110 and the panel 106*c*' within the pocket.

Figure 5:
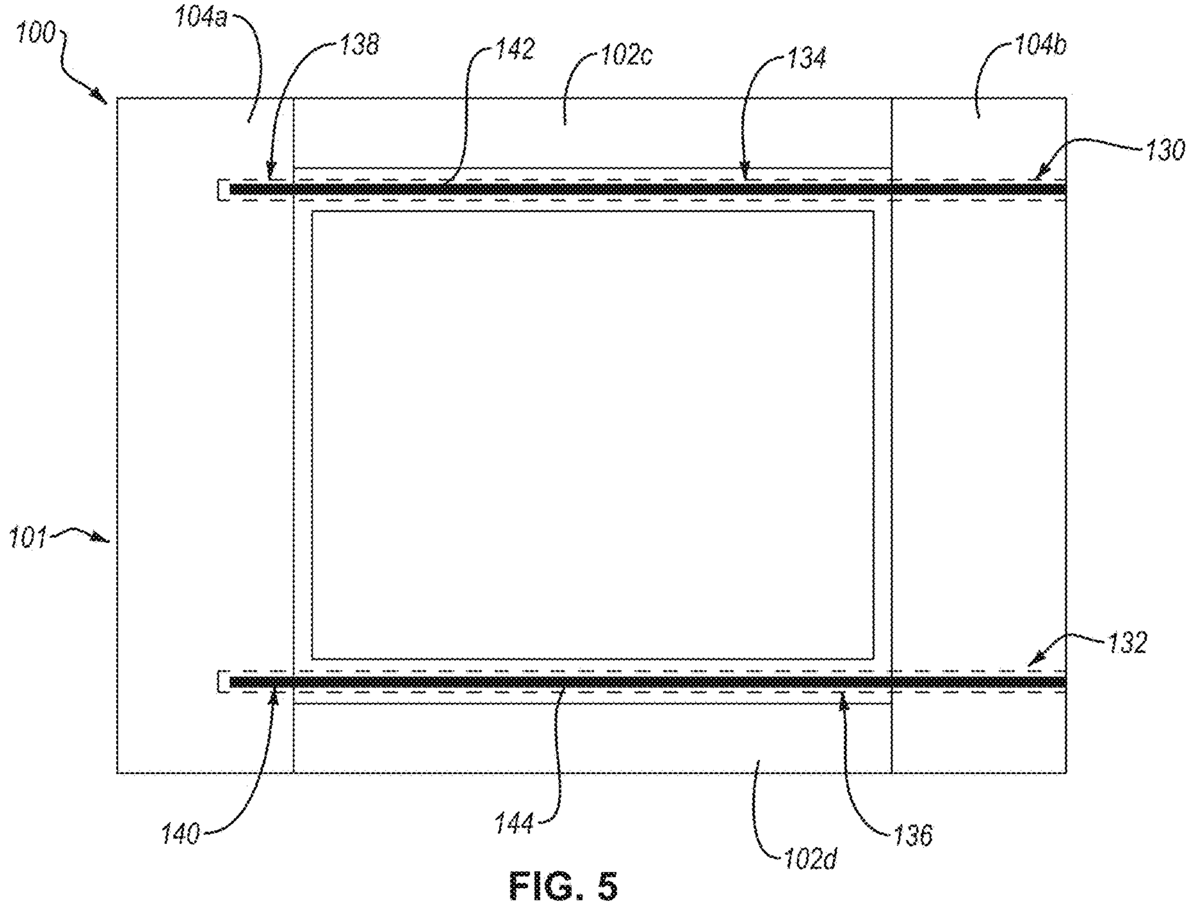
FIG. 5 illustrates connection features of a door system according to an example embodiment of the present disclosure.

The connection features shown in FIGS. 4A-4C are merely one example. FIG. 5 illustrates another example of connection features that may be employed to secure the retaining frame 110 within the pocket 108. In this embodiment, the stile 104*b* includes channels 130, 132 extending therethrough. One end of the channels 130, 132 open to the outer surface of the stile 104*b* and opposite ends thereof open into the pocket 108. The retaining frame 110 includes channels 134, 136 extending therethrough. The stile 104*a* includes receptacle 138, 140 therein. The receptacles 138, 140 open into the pocket 108.

When the retaining frame 110 is disposed within the pocket 108, the channel 130, the channel 134, and the receptacle 138 align with one another and the channel 132, the channel 136, and the receptacle 140 align with one another. A rod 142 may be inserted through the channels 130, 134 and into the receptacle 138 and a rod 144 may be inserted through the channels 132, 136 and into the receptacle 140 to secure the retaining frame 110 within the pocket 108. A cover or other retention element may be attached to the edge of the stile to conceal and hold the rods 142, 144 in place when the panel 106*c* is not being changed.

When it is desired to change the panel 106*c*, the rods 142, 144 may be withdrawn from the channels/receptacles, thereby allowing the retaining frame 110 to be removed from the pocket 108. With the retaining frame 110 removed from the pocket 108, the panel 106*c* can similarly be removed from the pocket 108 and replaced with another panel 106*c*'. Thereafter the retaining frame 110 and rods 142, 144 can be reinstalled to secure the panel 106*c*' within the pocket 108.

While FIG. 5 includes the channels 134, 136 that extend entirely through the retaining frame 110, this is merely exemplary. In other embodiments, the channels 134, 136 may only extend partially through the retaining frame 110. In such embodiments, the rods 142, 144 may only extend through the channels 130, 132 and into the channels 134, 136, but not into the stile 104*a* (or receptacles therein). In such embodiments, the retaining frame 110 may include a latch (similar to the latch 114) that is configured to extend into a receptacle in the stile 104*a*.

While the embodiments of FIGS. 1-5 include a replaceable panel and a separate retaining frame, the retaining frame and the panel may be secured together or integrally formed. In such an embodiment, the retaining frame and the panel may be removed from the pocket in the door as a single unit and replaced with another panel and retaining frame that are similarly secured together or integrally formed.

In still other embodiments, a door according to the present disclosure does not require a retaining frame. In cases where a retaining frame is not included, connection features may be included as part of the panel 106*c*. For instance, the connection features shown and described in connection with the retaining frame 110 may be included as part of the panel 106*c*. As such, the panel 106*c* may include the latches 114, 118 that mate with the receptacles 116, 120. Alternatively, the panel 106*c* may include the channels 134, 136 that are configured to receive the rods 142, 144. When the connection features are included as part of the panel 106*c*, a retaining frame is not necessary to hold the panel 106*c* in the pocket 108. Rather, the connection features on the panel 106*c* may be sufficient to hold the panel 106*c* in the pocket 108.

Although the illustrated embodiments have focused on the ability to remove and replace panels of a door, the scope of the present disclosure extends beyond that. For instance, rather than replacing a door panel, one of the rails or panels of the door may be selectively secured to the door in multiple configurations. The manner of securing and removing the rail or panel may be the same as or similar to the other examples provided herein.

In one embodiment, a rail may be secured to the door with a first face thereof exposed so as to appear merely as a typical rail. The rail may also be removed from the door and resecured to the door with a second face thereof exposed. The second face of the rail may have a different design or appearance than the first face (e.g., different color, pattern, image, wording, etc.). Additionally, or alternatively, the second face of the rail may have a functional implement associated therewith. For instance, the second face may have a hook extending therefrom. In such case, the rail may be attached to the door with the second face exposed so that a wreath, sign, or other decoration may be hung from the hook. When the wreath, sign, or other decoration is not to be displayed, the rail may be removed and reattached with the first face exposed to provide a traditional look without the hook being visible.

In light of the disclosure, a door system may take a variety of configurations. For instance, a door system may include: a door having a pocket in a face thereof, a panel sized and configured to be positioned within the pocket, and one or more connection features configured to selectively hold the panel in the pocket and allow for ready removal of the panel from the pocket.

In some embodiments, the door system also includes a retaining frame configured to be positioned within the pocket and over a portion of the panel to selectively retain the panel within the pocket, the retaining frame being selectively: (i) removable from the pocket to allow for the panel to be removed and replaced with a different panel, and (ii) securable within the pocket with the one or more connection features to retain the panel within the pocket.

In some embodiments, the retaining frame is selectively securable within the pocket with one or more rods that extend at least partially through the door and into the retaining frame.

In some embodiments, the one or more rods are configured for selective withdrawal from the retaining frame to allow for the retaining frame to be selectively removed from the pocket.

In some embodiments, the retaining frame is selectively securable within the pocket with one or more sets of latches and receptacles.

In some embodiments, at least one of the latches is spring loaded, such that the latch is biased to an extended position and can be selectively moved to a retracted position.

In some embodiments, the door comprises a channel therethrough, the channel being configured to receive a rod or key that is configured to move the spring-loaded latch from the extended position to the retracted position.

In some embodiments, at least one of the latches extends a fixed distance from an outer surface of the retaining frame.

In some embodiments, the spring-loaded latch and the fixed-distance latch are disposed on opposing sides of the retaining frame.

In some embodiments, the panel and the retaining frame are secured together or integrally formed.

In some embodiments, the one or more connection features comprise one or more latches associated with the panel and one or more receptacles associated with the door.

In some embodiments, at least one of the latches is movable relative to the panel between a retracted position and an extended position.

In some embodiments, the one or more connection features comprise one or more channels in the door, one or more corresponding channels in the panel, and one or more rods that can be selectively extended into the channels to secure the panel to the door.

In one embodiment, a door system includes a door having a pocket in a face thereof, a panel sized and configured to be positioned within the pocket, one or more connection features associated with the door and the panel, the one or more connection features being configured to selectively secure the panel within the pocket and allow for selective removal of the panel for replacement with a different panel.

In some embodiments, the one or more connection features comprise a fixed latch extending from one side of the panel and a movable latch extending from an opposing second side of the panel and corresponding receptacles in the door that are configured to receive the fixed latch and movable latch therein.

In some embodiments, the door includes a channel extending to the receptacle that is configured to receive the movable latch, the channel being configured to have a rod extended therethrough to move the movable latch from an extended position to a retracted position.

In some embodiments, the one or more connection features comprise corresponding channels in the door and the panel and a rod that is selectively: insertable into the channels to selectively secure the panel in the pocket, and removable from the channels to enable the panel to be removed from the pocket.

In one embodiment, a door system includes a door having a pocket in a face thereof, a panel sized and configured to be positioned within the pocket, a retaining frame configured to be positioned within the pocket and over a portion of the panel to selectively retain the panel within the pocket, and one or more connection features associated with the door and the retaining frame, the one or more connection features being configured to selectively secure the retaining frame within the pocket and allow for selective removal of the retaining frame enable the panel to be replaced with a different panel.

In some embodiments, the one or more connection features comprise: a fixed latch extending from one side of the retaining frame, a movable latch extending from an opposing second side of the retaining frame, corresponding receptacles in the door that are configured to receive the fixed latch and movable latch therein, and a channel extending to the receptacle that is configured to receive the movable latch, the channel being configured to have a rod extended therethrough to move the movable latch from an extended position to a retracted position.

In some embodiments, the one or more connection features comprise corresponding channels in the door and the retaining frame and a rod that is selectively: insertable into the channels to selectively secure the retaining frame in the pocket, and removable from the channels to enable the retaining frame to be removed from the pocket.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A door system, comprising:

a door having a pocket in a front face thereof, the pocket having a back wall and an interior surface with a first receptacle extending into the interior surface on a first side of the pocket and a second receptacle extending into the interior surface on a second side of the pocket, the door also having a channel that has a first opening in an exterior side surface of the door and a second opening that opens into the second receptacle, the channel being configured to receive a rod or key in the first opening and that is configured to extend into the second receptacle through the second opening;

a removable panel sized and configured to be positioned within the pocket and against the back wall such that a front face of the removable panel is recessed within the pocket and relative to the front face of the door; and a retaining frame configured to be positioned within the pocket and over a portion of the removable panel to selectively retain the removable panel within the pocket, the retaining frame comprising a protrusion extending a fixed distance from a first side of the retaining frame and configured to be received within the first receptacle and a latch that is configured to extend a variable distance from a second side of the retaining frame and be received within the second receptacle, wherein the rod or key is configured to extend into the second receptacle to move the latch from an extended position to a retracted position.

2. The door system of claim 1, wherein the retaining frame is selectively: (i) removable from the pocket to allow for the removable panel to be removed and replaced with a different removable panel, and (ii) securable within the pocket with the protrusion and latch received within the first and second receptacles to retain the removable panel within the pocket.

3. The door system of claim 1, wherein the retaining frame and/or the removable panel comprises an ejection feature configured to facilitate removal of the retaining frame and/or the removable panel from the pocket.

4. The door system of claim 3, wherein the ejection feature comprises a spring-loaded button.

5. The door system of claim 4, wherein the spring loaded button is positioned at least partially within a recess within the removable panel or retaining frame.

6. The door system of claim 1, wherein the protrusion and latch are disposed on opposing sides of the retaining frame and the first and second receptacles are disposed on opposing sides of the pocket.

7. The door system of claim 1, wherein the latch is spring loaded, such that the latch is biased to the extended position and can be selectively moved to the retracted position.

8. The door system of claim 1, wherein the back wall and the first and second receptacles are spaced apart from one another a distance that is equal to or greater than a thickness of the removable panel, such that the removable panel can fit between the back wall and the first and second receptacles.

9. The door system of claim 1, wherein the removable panel and the retaining frame are secured together or integrally formed.

10. A door system, comprising:

a door having a pocket in a front face thereof, the pocket having a first interior sidewall surface with a first receptacle extending into the first interior sidewall surface on a first side of the pocket and a second receptacle extending into a second interior sidewall surface on a second side of the pocket, the door further comprising a channel that has a first opening in an exterior side surface of the door and a second opening that opens into the second receptacle, the second interior sidewall surface of the pocket and the exterior side surface of the door being generally parallel to one another, the channel extending generally straight between the first opening in the exterior side surface of the door and the second opening in the second interior sidewall surface of the pocket, and the channel being generally perpendicular to the first and second openings, the channel being configured to receive a rod or key in the first opening and that is configured to slidingly extend into the second receptacle through the second opening; and a removable panel configured to be selectively positioned within the pocket and connected to the door, the removable panel comprising a protrusion extending a fixed distance from a first side of the removable panel and configured to be received within the first receptacle and a latch that is configured to extend a variable distance from a second side of the removable panel and be received within the second receptacle, wherein the rod or key is configured to extend into the second receptacle to move the latch from an extended position to a retracted position.

11. The door system of claim 10, wherein at least one of the removable panel or the door comprises an ejection feature configured to facilitate removal of the removable panel from the pocket.

12. The door system of claim 10, wherein the removable panel has opposing first and second faces, the removable panel being selectively connectable to the door with either the first face or the second face being visible.

13. A door system, comprising:

a door having:

a pocket in a front face of the door, the pocket having:

a first interior sidewall surface with a receptacle extending into the first interior sidewall surface on a first side of the pocket;

a second interior sidewall surface with an opening therein on a second side of the pocket; and a back wall extending between the first and second interior sidewall surface;

a channel that extends between the opening in the second interior sidewall surface of the pocket and an opening on an exterior side surface of the door, the channel extending generally straight between the openings, and the channel being generally perpendicular to the opening in the second interior sidewall surface of the pocket and the opening an exterior side surface of the door;

a removable panel assembly sized and configured to be positioned within the pocket, the removable panel assembly having:

a protrusion extending a fixed distance from a first side thereof and configured to be received within the receptacle; and a channel extending partially therein from a second side of the removable panel assembly, the channel of the removable panel assembly being aligned with the channel of the door when the removable panel assembly is positioned within the pocket; and at least one rod that is configured to be inserted, from the exterior side surface of the door, into the aligned channels to secure the removable panel assembly in the pocket.

14. The door system of claim 13, wherein the removable panel assembly comprises a decorative pane.

15. The door system of claim 14, wherein the removable panel assembly further comprises a retention frame.

16. The door system of claim 15, wherein the retention frame comprises the protrusion and the channel.

17. The door system of claim 14, wherein the decorative panel comprises the protrusion and the channel.

* * * * *